UNITED STATES PATENT OFFICE.

JOSEPH SCHECKENBACH, OF MUNICH, GERMANY.

PROCESS OF MANUFACTURING FUSEL-OIL.

1,118,238.  Specification of Letters Patent.  Patented Nov. 24, 1914.

No Drawing.   Application filed September 17, 1913.   Serial No. 790,291.

*To all whom it may concern:*

Be it known that I, JOSEPH SCHECKENBACH, doctor of philosophy and chemist, a subject of the German Emperor, and resident of Munich, in the Kingdom of Bavaria, German Empire, have invented a new and useful Process of Manufacturing Fusel-Oil, of which the following is a specification.

My invention relates to a process of manufacturing considerable quantities of fusel oil by allowing bacteria to act upon appropriate substances, such as starch, cellulose, and the like, or upon other materials containing any one of the just-mentioned substances. In contradistinction to the known methods of producing fusel oil, the basic material is in my improved method, subjected to the action of the so-called "heat-proof" bacteria, that is to say, such bacteria as are capable of standing for half an hour the heat of saturated steam having the temperature of boiling water, *i. e.*, 100° C. My process is based upon the discernment, the correctness of which has been proved by tests, that solely these last-mentioned bacteria come into consideration for the production of fusel oil. Therefore, by subjecting the basic material only to the action of the bacteria in question, all the other bacteria which do not participate in the economical production of fusel oil, but which, in the contrary, impair the action of the "heat-proof" bacteria, that is to say the economical manufacture of fusel oil, are eliminated. The hurtful secondary effect of the non-heat-proof bacteria, which existed up to now, is consequently done away with and the economical production of fusel oil thus considerably promoted.

In carrying my invention into practice, I proceed, for instance, as follows: The basic material, for instance one or the other of those before mentioned, is sterilized to such a degree as to destroy the ferments, hyphomycetes, and the like, as well as the non-heat-proof bacteria, the so-called "heat-proof" bacteria being the only ones remaining, that is to say, those bacteria, the spores of which are capable of resisting for half an hour the action of saturated steam at 100° C. The sterilization may be effected either solely by steam, or by steam and pressure combined, or by any other suitable means. After the sterilized substance has cooled down, it is left to the action of the "heat-proof" bacteria, whereby considerable quantities of fusel oil are formed which may be separated by distillation or any other procedure.

The basic material is preferably broken down or disintegrated in any suitable way and is wholly or partially turned to sugar, or saccharified. According to the nature of the basic material, this latter may have nutritive salts admixed, and the acid formed during the process may be neutralized or weakened by appropriate means. My process may be carried out also in this way that after the sterilization of the basic material has taken place with the above described degree, some other "heat-proof"-bacteria-containing substance is admixed with the mash. The respective bacteria are advantageously such as are obtained by pure culture, preferably absolutely pure culture, enrichment, and the like, and they may be those occurring in the basic materials above stated or in other substances or materials, such as earth, dung water or the like, hay, and so on. Furthermore, my process may be carried out in this way that the basic materials are sterilized until all bacteria have been killed, that is to say, the "heat-proof" ones too. In this case, the decomposition of the mash is effected solely by admixed bacteria.

The vessels employed in carrying through the process may be open or closed. Whether they are ventilated and whether their contents is stirred, depends upon the base-substance, as well as upon the kind of bacteria used.

Having now described my invention, what I desire to secure by a patent of the United States is:

1. The process of producing fusel oil by means of bacteria, consisting in subjecting a mixture comprising essentially a carbohydrate to the exclusive action of such bacteria as are capable of standing the heat of saturated steam at 100° C. for about half an hour, substantially as described.

2. The process of producing fusel oil by means of bacteria consisting in sterilizing completely a mixture comprising essentially a carbohydrate, and subjecting it to the exclusive action of bacteria capable of standing the heat of saturated steam at 100° C. for about half an hour and obtained by pure culture, substantially as described.

In testimony whereof, I affix my signature in presence of two witnesses.

Dr. JOSEPH SCHECKENBACH.

Witnesses:
 JOHANNA STERN,
 A. V. W. COTTER.